United States Patent
Wakabayashi

(10) Patent No.: US 6,295,273 B1
(45) Date of Patent: Sep. 25, 2001

(54) PHASE MODULATION MULTIPLEXING TRANSMISSION UNIT AND PHASE MODULATION MULTIPLEXING METHOD

(75) Inventor: Yasuhiko Wakabayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/746,581

(22) Filed: Nov. 14, 1996

(30) Foreign Application Priority Data

Nov. 15, 1995 (JP) .................................................. 7-297031

(51) Int. Cl.[7] .................................................. H04L 27/18
(52) U.S. Cl. .................................................. 370/215; 375/302
(58) Field of Search .................................................. 370/204, 215, 370/683; 375/200, 206, 260, 302, 308, 322, 329, 330, 331, 332, 333

(56) References Cited

U.S. PATENT DOCUMENTS 5,126,998 * 6/1992 Stem, Jr. .................................................. 370/11
5,291,515 * 3/1994 Uchida et al. .................................................. 375/1

FOREIGN PATENT DOCUMENTS 4-360434 12/1992 (JP) .
5-30079 2/1993 (JP) .

* cited by examiner

*Primary Examiner*—Huy D. Vu
(74) *Attorney, Agent, or Firm*—Ostrolenk, Faber, Gerb & Soffen, LLP

(57) ABSTRACT

In the phase modulation multiplexing transmission unit of FIG. 2, a digital input signal is divided by a signal division unit 1, each of the resultant division signals is output to multiplication units 3a and 3b, respectively. The multiplication units 3a and 3b multiply the division signals by spread code signals output from spread code generators 2a and 2b, respectively. A multiplication signal Sb output from the multiplication unit 3b is shifted by π/2 radian through a phase shifter 4, which is added to a multiplication signal Sa output from the multiplication unit 3a through an adder 5. A synthetic signal Se(n) output from the adder 5 is BPSK modulated through a modulator 6, which is transmitted through a transmission amplifier 7 and an antenna 8.

2 Claims, 7 Drawing Sheets

PHASE MODULATION MULTIPLEXING TRANSMISSION UNIT AND PHASE MODULATION MULTIPLEXING METHOD

BACKGROUND OF THE PRESENT INVENTION

The present invention relates to a phase modulation multiplexing transmission unit for multiplexing and transmitting a phase modulation signal in a spectrum spread (referred to as, SS hereinafter) transmission system.

FIG. 5 is a block diagram showing a construction of a conventional phase modulation multiplexing transmission unit.

The prior art shown in FIG. 5 comprises a signal division unit 1 for dividing a digital input signal into two division signals $I1(n)$ and $I2(n)$ for outputting and spread code generators 2a and 2b for generating and outputting spread codes $C1(n)$ and $C2(n)$ for spectrum spreading. This prior art further comprises multiplication units 3a and 3b for outputting multiplication signals Sa and Sb obtained by multiplying the division signals $I1(n)$ and $I2(n)$ by the spread codes $C1(n)$ and $C2(n)$ output from the spread code generators 2a and 2b, respectively.

Additionally this prior art comprises an adder 5 for outputting a synthetic signal $Sc(n)$ obtained by summing the multiplication signals Sa and Sb output from the multiplication units 3a and 3b, a modulator 6 for two-phase modulating (referred to as, BPSK hereinafter) the synthetic signal $Sc(n)$ output from the adder 5, a transmission amplifier 7 for amplifying and outputting the phase modulation signal output from the modulator 6 and an antenna 8 through which the amplified phase modulation signal output from the transmission amplifier 7 is transmitted.

The operation of this prior art is described hereinafter.

The signal division unit 1 divides a digital input signal into two division signals $I1(n)$ and $I2(n)$, each of which is input to the multiplication units 3a and 3b, respectively. The spread code generators 2a and 2b generate spread codes $C1(n)$ and $C2(n)$ for spectrum spreading, each of which is output to the multiplication units 3a and 3b, respectively. The multiplication unit 3a multiplies the division signal $I1(n)$ input from the signal division unit 1 by the spread code $C1(n)$ output from the spread code generator 2a. The resultant multiplication signal Sa is obtained from the following equation (1).

$$Sa = I1(n) * C1(n) \quad (1)$$

The multiplication unit 3b multiplies the division signal $I2(n)$ input from the signal division unit 1 by the spread code $C2(n)$ output from the spread code generator 2b. The resultant multiplication signal Sb is obtained from the following equation (2).

$$Sb = I2(n) * C2(n) \quad (2)$$

The adder 5 sums the multiplication signals Sa and Sb output from the multiplication units 3a and 3b, respectively for synthesizing. The resultant synthetic signal $Sc(n)$ is obtained from the following equation (3).

$$Sc(n) = Sa + Sb = I1(n) * C1(n) + I2(n) * C2(n) \quad (3)$$

The modulator 6 two-phase modulates (BPSK) the synthetic signal $Sc(n)$, which is amplified by the transmission amplifier 7 and then transmitted through the antenna 8. The spread codes $C1(n)$ and $C2(n)$ respectively generated by the spread code generators 2a and 2b have excellent self-correlation characteristics using code exhibiting good mutual correlation characteristics (close to non-correlation).

FIG. 6 shows coordinates of the synthetic signal $Sc(n)$ output from the adder 5.

As FIG. 6 shows, the multiplication signals Sa and Sb respectively output from the multiplication units 3a and 3b overlap with each other at coordinates (1, 0) and (−1, 0) on the phase plane. The synthetic signal $Sc(n)$ is defined by signal coordinates (2, 0), (−2, 0) and (0, 0) as shown in FIG. 6. Accordingly the peak level of dualized synthetic signal $Sc(n)$ is doubled, thus increasing the electric power by 4 times ($2^2$).

FIG. 7 is a graphical representation of an input/output characteristic of the transmission amplifier 7.

Referring to FIG. 7, assuming that the number of multiplexing is 2 (dual), the peak level of the BPSK input/output signal input to the transmission amplifier 7 becomes two times higher than that before multiplexing owing to a high ratio of the average power to the peak power (peak factor). In order to amplify the modulation signal output from the modulator 6 through the transmission amplifier 7 and to transmit the resultant amplified phase modulation signal at a low bias, a broad linear area is required.

Prior arts disclosed by a publication of JP-A-360434/1992 titled "Spectrum spread transmission unit and spectrum spread reception unit" and a publication of JP-A-30079/1993 titled "Spectrum spread modulation unit" have been well known as arts related to the above-described device.

In the publication of JP-A-360434/1992, each bit of parallel data is spread based on a plurality of spread codes and parallel transmitted for spectrum spread transmission at a high rate.

In the publication of JP-A-30079/1993, parallel data converted from serial data are delayed for shifting codes through spread modulation with n delay PN codes which have been phase corrected. As a result, efficient high rate data transmission is realized by preventing degradation in the spectrum spread communication characteristic.

Those conventional phase modulation multiplexing transmission units allow for high rate data transmission. However they need substantially a broad area where the transmission amplifier 7 amplifies the modulation signal output from the modulator 6 at a low bias for transmission. As a result, a large-sized transmission amplifier is necessary, resulting in increasing the cost.

SUMMARY OF THE INVENTION

It is an object of the present invention to solve the aforementioned problem of those prior arts.

It is another object of the present invention to provide a phase modulation multiplexing transmission unit reducing the size of a transmission amplifier for executing amplification at a low bias in relatively a narrow linear area due to decreased peak of the multiplexing signal during multiplexing and high-rate data transmission. Reducing the transmission amplifier size, therefore leads to cost reduction.

The present invention is achieved by a phase modulation multiplexing transmission unit comprising: multiplication means for outputting a plurality of multiplication signals derived from multiplying each of a plurality of division signals obtained by dividing a digital input signal by respective ones of a plurality of spread code signals; phase shifting means for shifting a phase so that all or less than all of the plurality of multiplication signals has a phase difference; addition means for outputting a multiplexing signal by summing the plurality of all multiplication signals, including those that have been phase shifted and those that have not been phase shifted; and modulation means for modulating the multiplexing signal for outputting.

Furthermore, the present invention is achieved by a phase modulation multiplexing method comprising steps of: generating a plurality of multiplication signals by multiplying each of a plurality of division signals obtained by dividing a digital input signal by respective ones of a plurality of spread code signals; shifting a phase so that all or less than all of the plurality of multiplication signals has a phase difference; generating a multiplexing signal by summing a plurality of multiplication signals including those that have been phase shifted and those that have not been phase shifted; and modulating the multiplexing signal.

In the phase modulation multiplexing transmission unit of the present invention, multiplexing (addition) is executed by shifting the phase of the phase modulation signal. As a result, the ratio of the average power to the peak power (peak factor) of the multiplexed signal for multiplexing and high rate data transmission is decreased. That is, the decreased multiplexed signal peak requires only a narrow linear area where the transmission amplifier amplifies the modulation signal for outputting at a low bias, thus reducing the size of the transmission amplifier.

BRIEF DESCRIPTION OF THE DRAWINGS

This and other objects, features and advantages of the present invention will become more apparent upon a reading of the following detailed description and drawings, in which.

DETAILED DESCRIPTION OF THE INVENTION

Figure 5:
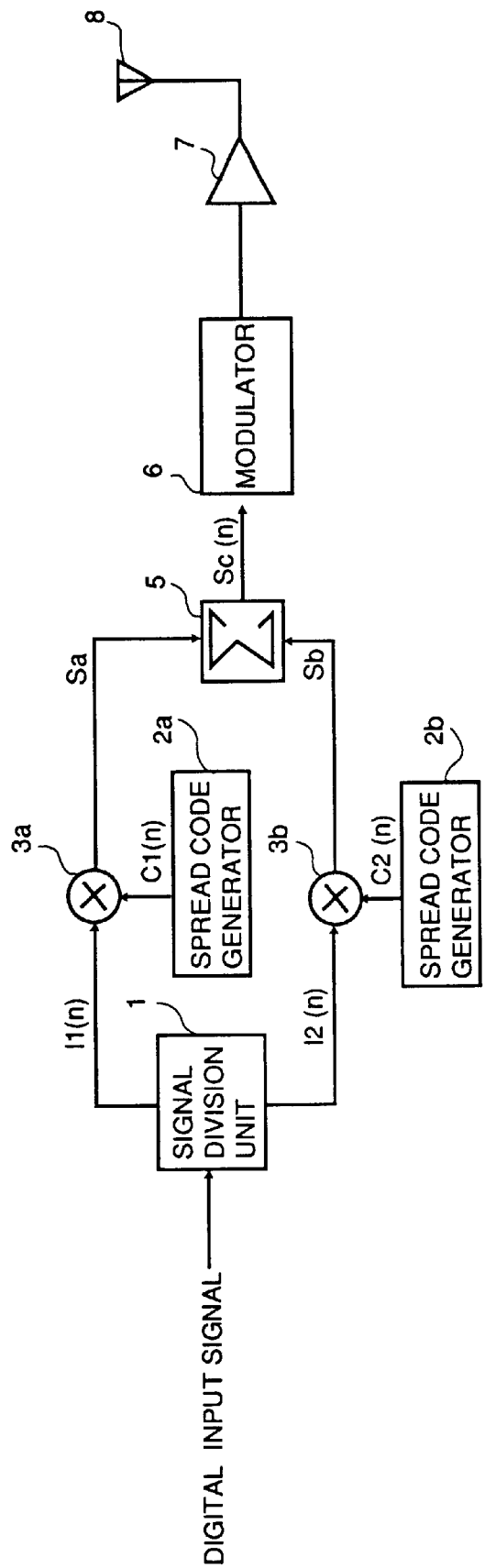
FIG. 5 is a block diagram of a prior art phase modulation multiplexing transmission unit.
Figure 6:
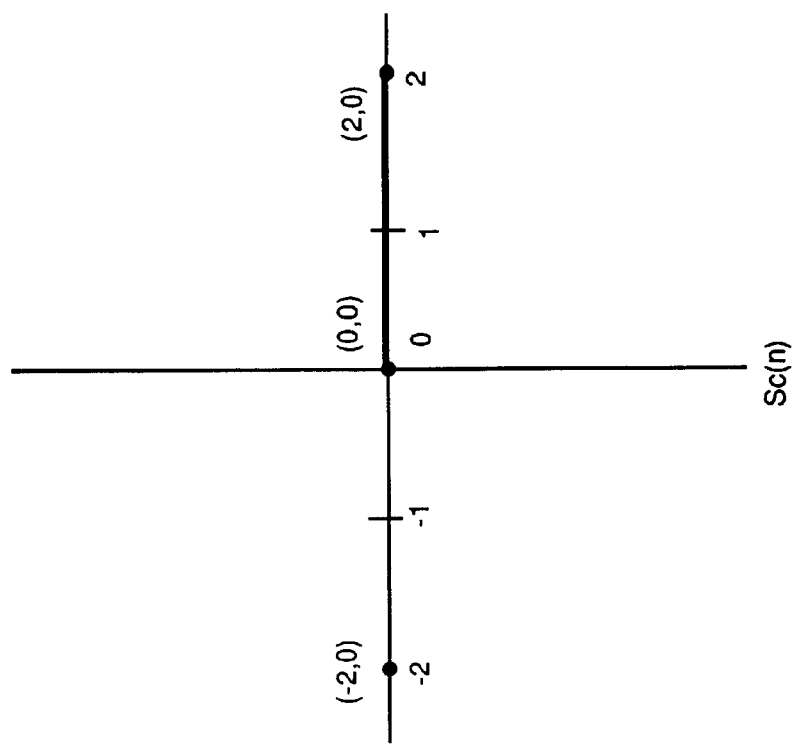
FIG. 6 shows coordinates of a synthetic signal of a prior art.
Figure 6:
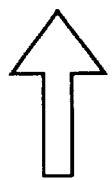
Figure 6:
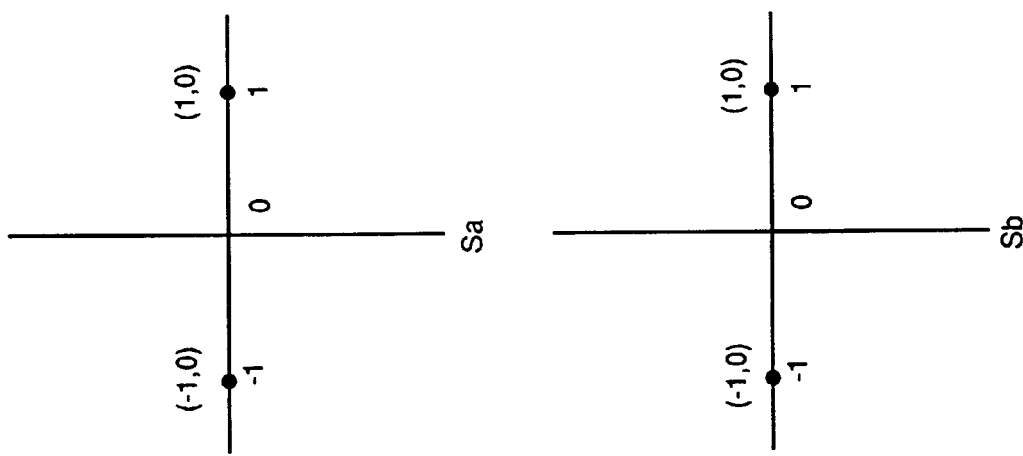
Figure 7:
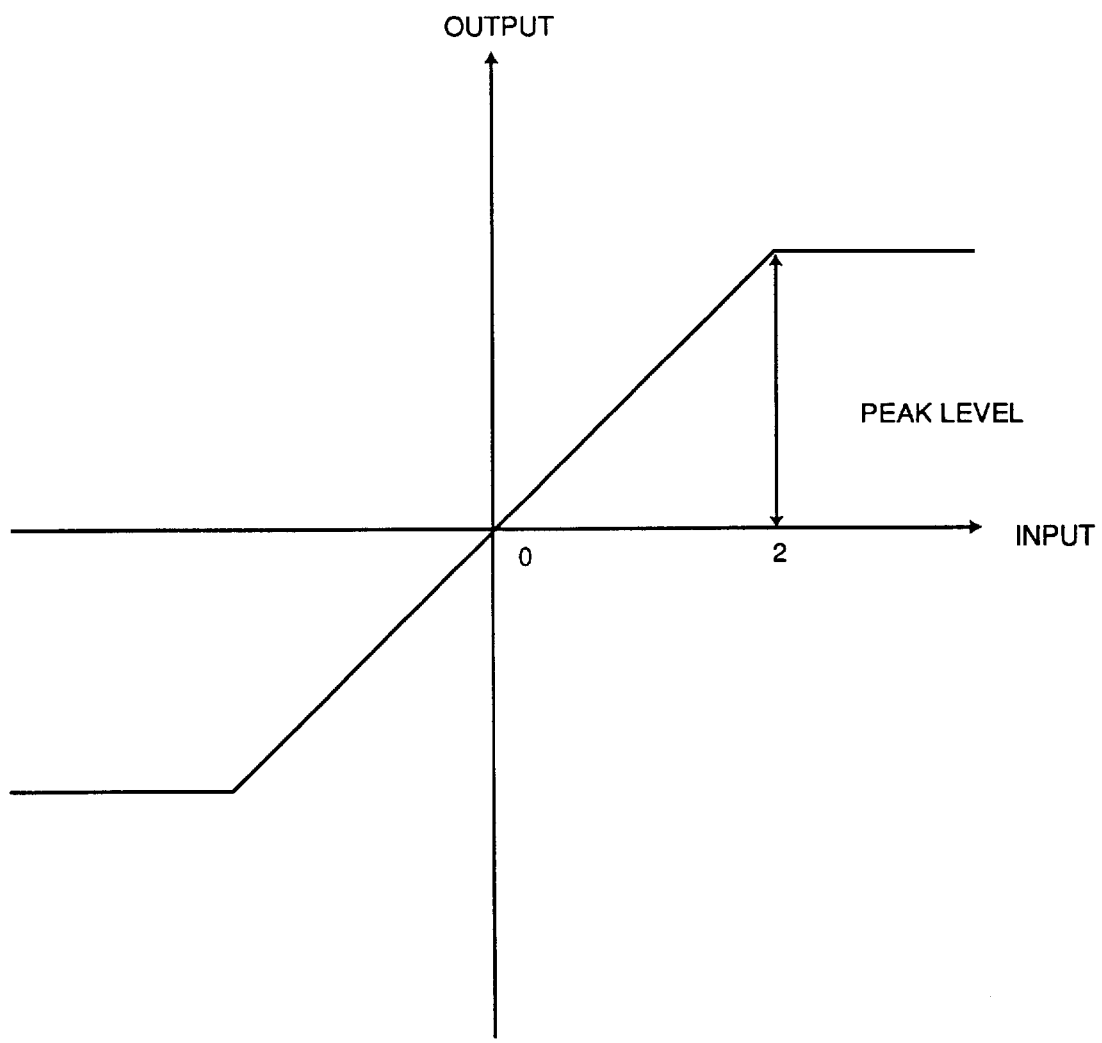
FIG. 7 is a graphical representation of an input/output characteristics of a prior art transmission amplifier.

Referring to drawings, an embodiment of a phase modulation multiplexing transmission unit of the present invention is described in detail. The same components as those shown in FIGS. 5 to 7 are provided with the same reference numerals.

Figure 1:
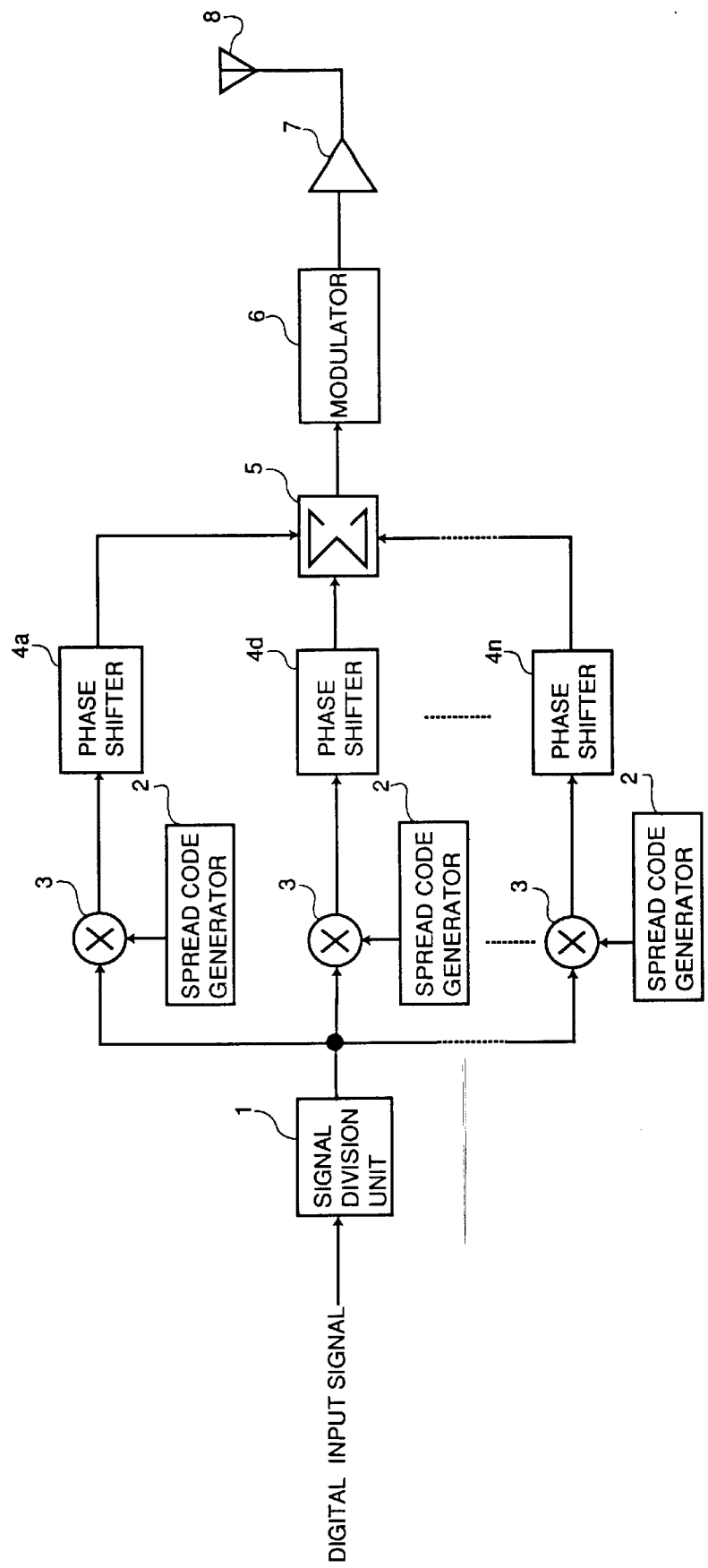
FIG. 1 is a block diagram of a phase modulation multiplexing transmission unit of an embodiment of a present invention.

FIG. 1 is a block diagram showing a construction of a phase modulation multiplexing transmission unit of an embodiment of the present invention.

As shown in FIG. 1, the phase modulation multiplexing transmission unit comprises a signal division unit 1 for dividing a digital input signal into n signals for outputting, spread code generators 2a, 2b . . . 2n each generating and outputting a spread code for spectrum spreading and multiplication units 3a, 3b . . . 3n each multiplying the division signal output from the signal division unit 1 by the spread code output from the spread code generators 2a, . . . 2n, respectively for outputting.

The phase modulation multiplexing transmission unit further comprises phase shifters 4a, 4b, . . . 4n each shifting the phase of the respective multiplication signals output from the multiplication units 3a, . . . 3n and an adder 5 for outputting a synthetic signal derived from summing the multiplication signals output from the respective phase shifters 4a, . . . 4n. A modulator 6 for two-phase modulating (BPSK) the synthetic signal output from the adder 5 for outputting, a transmission amplifier 7 for amplifying the phase modulation signal output from the modulator 6 and an antenna 8 for transmitting an amplified phase modulation signal output from the transmission amplifier 7 are further provided.

Figure 2:
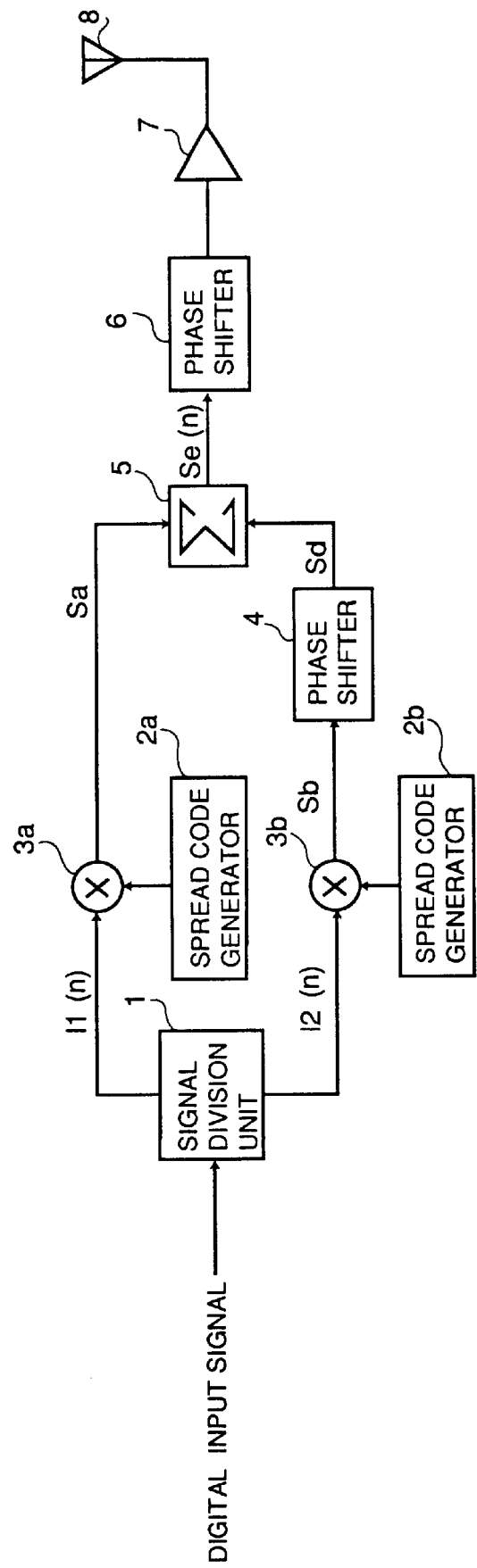
FIG. 2 is a block diagram of a phase modulation multiplexing transmission unit of an embodiment in case of BPSK.

FIG. 2 is a block diagram showing a construction of the phase modulation multiplexing transmission unit derived from simplifying the construction shown in FIG. 1.

This embodiment shown in FIG. 2 is provided in case of BPSK where the number of multiplexing is set to 2. Therefore the phase modulation multiplexing transmission unit of this embodiment comprises a signal division unit 1 for dividing a digital input signal into two division signals I1($n$) and I2($n$), spread code generators 2a and 2b for generating and outputting spread codes C1($n$) and C2($n$) for spectrum spreading and multiplication units 3a and 3b for outputting multiplication signals Sa and Sb obtained by multiplying the division signals I1($n$) and I2($n$) output from the signal division unit 1 by the spread codes C1($n$) and C2($n$) output from the spread code generators 2a and 2b, respectively.

The phase modulation multiplexing transmission unit of this embodiment further comprises a phase shifter 4 for shifting the multiplication signal Sb output from the multiplication unit 3b with $\pi/2$ radian phase difference for outputting and an adder 5 for outputting a synthetic signal Se(n) derived from summing the multiplication signal Sa output from the multiplication unit 3a and a $\pi/2$ phase difference signal Sd output from the phase shifter 4. A modulator 6 for two-phase modulating (BPSK) the synthetic signal Se(n) output from the adder 5 for outputting, a transmission amplifier 7 for amplifying the phase modulation signal output from the modulator 6 for outputting and an antenna 8 for transmitting the amplified phase modulation signal output from the transmission amplifier 7 are further provided.

The operation of the above-described phase modulation multiplication transmission unit is described.

The signal division unit 1 divides a digital input signal into two division signals I1($n$) and I2($n$), which are input to multiplication units 3a and 3b, respectively. Each of the spread code generators 2a and 2b generates a spread code C1($n$) and C2($n$) for spectrum spreading, which is output to the multiplication units 3a and 3b, respectively. The multiplication unit 3a multiplies the division signal I1($n$) input from the signal division unit 1 by the spread code C1($n$) output from the spread code generator 2a. The resultant multiplication signal Sa is obtained from the following equation (4).

$$Sa + I1(n) * C1(n) \tag{4}$$

The multiplication unit 3b multiplies the division signal I2($n$) input from the signal division unit 1 by the spread code C2($n$) output from the spread code generator 2b for outputting to the phase shifter 4. A $\pi/2$ phase difference signal Sd output from the phase shifter 4 is obtained from the following equation (5).

$$Sd = I2(n) * e^{j\pi/2 * C2(n)} \quad (5)$$

The adder 5 generates a synthetic signal Se(n) by summing the multiplication signal Sa output from the multiplication unit 3a and the π/2 phase difference signal Sd. The synthetic signal Se(n) is obtained from the following equation (6).

$$Se(n) = Sa + Sd = I1(n) * C1(n) + I2(n) * e^{j\pi/2 * C2(n)} \quad (6)$$

The modulator 6 two-phase modulates (BPSK) the synthetic signal Se(n), which is amplified through the transmission amplifier 7 and then transmitted through the antenna 8. Each of the spread codes C1(n) and C2(n) generated by the spread code generators 2a and 2b, respectively has a peak at the synchronous point using a code having excellent self correlation characteristic at points other than the synchronous point as well as good mutual correlation characteristic (close to noncorrelation).

Figure 3:
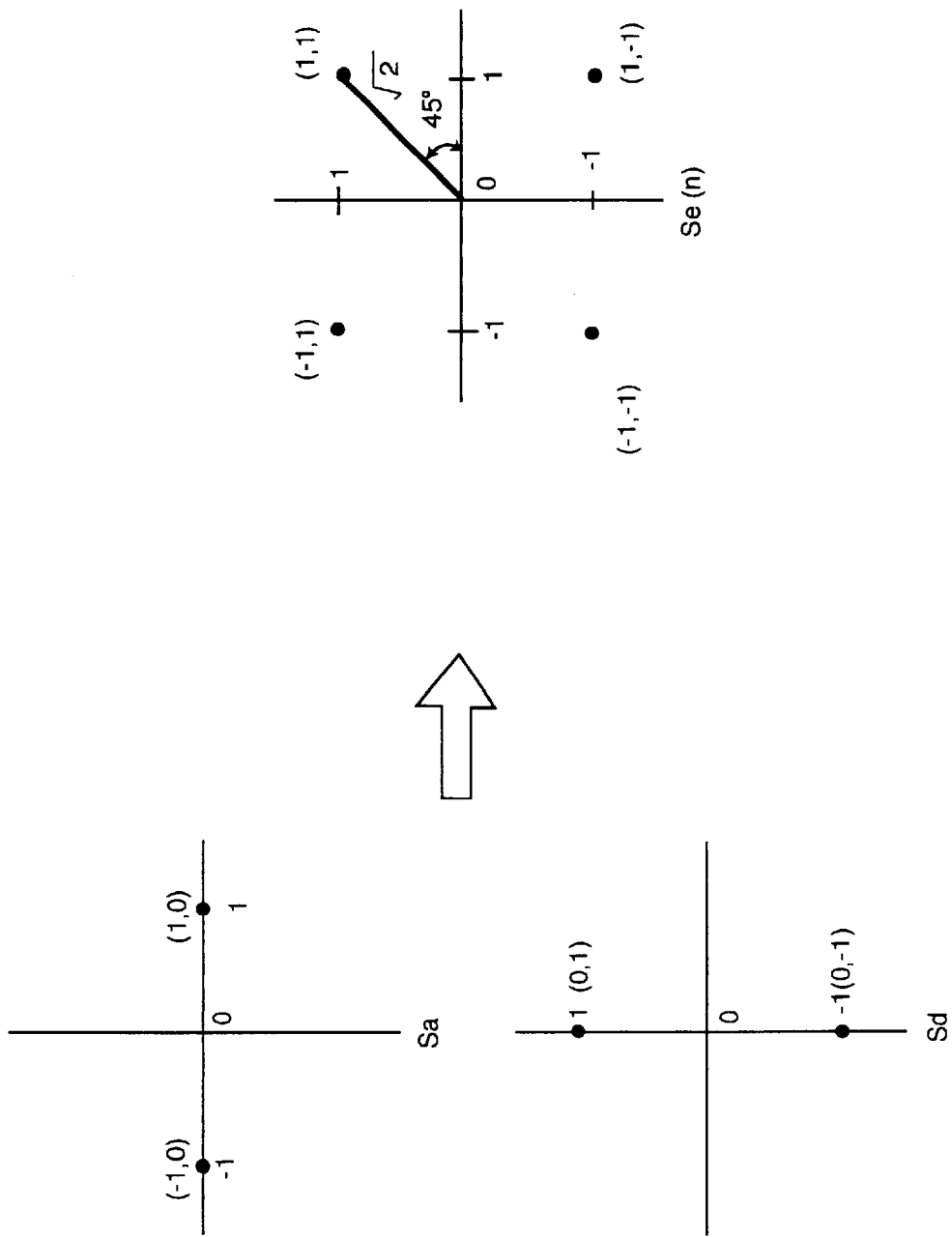
FIG. 3 shows coordinates of BPSK signals of an embodiment.

FIG. 3 represents coordinates of BPSK signals.

As FIG. 3 shows, the point of a multiplication signal Sa output from the multiplication unit 3a is defined by the coordinates (1, 0) and (−1, 0). The π/2 phase difference signal Sd output from the phase shifter 4 is defined by the coordinates (0, 1) and (0, −1) owing to π/2 radian phase difference.

As FIG. 3 shows, the synthetic signal Se(n) is defined by coordinates (1, 1), (1, −1), (−1, 1) and (−1, −1). Therefore the peak level of the BPSK signal of the synthetic signal Se(n) through the modulator 6 becomes √2 times higher (approximately 1.4 times), thus increasing the power by 2 times.

Figure 4:
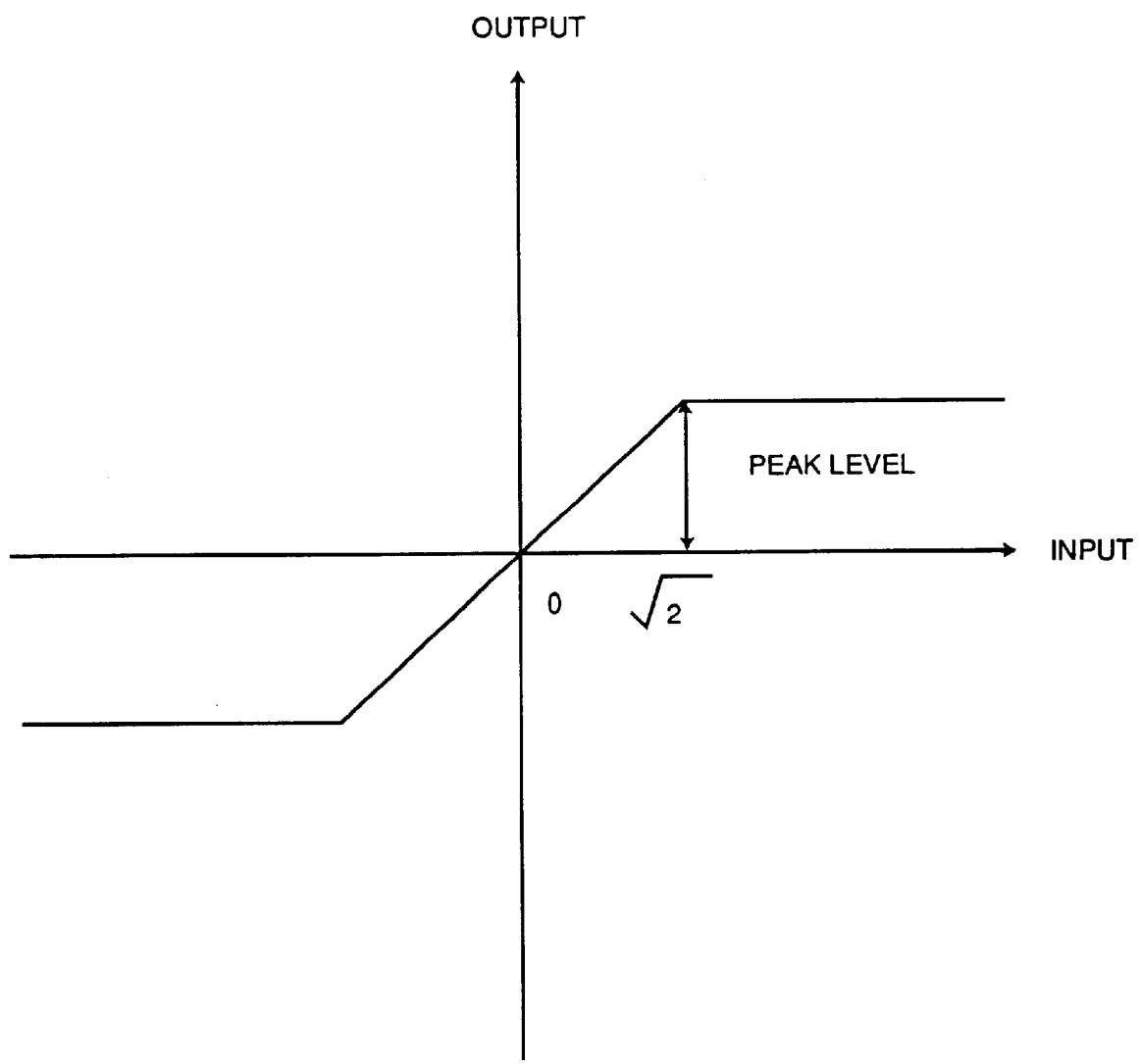
FIG. 4 is a graphical representation of an input/output characteristic of a transmission amplifier of an embodiment.

FIG. 4 is a graphical representation of an input/output characteristic of a transmission amplifier 7 of this embodiment.

In FIG. 4, the peak level of BPSK input/output signal input to the transmission amplifier 7 (the number of multiplexing: 2) becomes two times lower than that in the case shown in FIG. 7. As the multiplication signal Sb is synthesized (dualized) with π/2 radian phase difference, the ratio of average power to the peak power (peak factor) is decreased. This allows for transmission of the amplified phase modulation signal at a low bias even when the modulation signal output from the modulator 6 is amplified by the transmission amplifier 7 in an narrow linear area. As a result, the transmission amplifier size can be reduced.

It is assumed that the construction shown in FIG. 2 uses BPSK with the number of multiplexing set to 2 (dualized). However the number of multiplexing can be set to more than 2. In this case, for example, 3 multiplexing having π/3 or 2π/3 radian phase difference or 4 multiplexing having π/4, π/2 or 3π/4 radian phase difference can be realized.

The phase modulation multiplexing transmission unit of the present invention executes multiplexing by shifting each phase of the phase modulation signal. This unit decreases the ratio of the average power to the peak power (peak factor) of the multiplexing signal for the high rate data transmission. Accordingly the peak of the multiplexing signal is decreased, allowing for reduction of the transmission amplifier size even in the narrow linear area, resulting in cost reduction.

What is claimed is:

1. A phase modulation multiplexing transmission unit comprising:

signal division means for dividing a digital input signal;

a plurality of spread code generation means for generating spread code signals for spectrum spreading;

a plurality of multiplication means each for outputting a respective multiplication signal by multiplying an output of said signal division means by a respective spread code signal;

a phase shifting means for shifting a phase of at least one multiplication signal output from said plurality of multiplication means so that each of said plurality of multiplication signals subject to the phase shifting means has a phase difference;

addition means for generating a multiplexing signal by summing each of said multiplication signals including those having a phase difference and those not having a phase difference; and modulation means for modulating the multiplexing signal from said addition means and for providing a modulated signal as an output; and further wherein said addition means sums a multiplication signal output form said multiplication means and a signal with its phase shifted through said phase shifting means.

2. The phase modulation multiplexing transmission unit of claim 1, wherein said addition means sums all output signals output from said phase shifting means when each phase of all multiplication signals has been shifted.

* * * * *